United States Patent [19]

Wigton et al.

[11] Patent Number: 5,813,166
[45] Date of Patent: Sep. 29, 1998

[54] TRAP SYSTEM FOR REDUCING THE ENTRY OF FLYING INSECTS TO A DEFINED AREA

[54]

[75] Inventors: Bruce E. Wigton, Jamestown; Mark H. Miller, Hope, both of R.I.

[73] Assignee: American Biophysics Corp., Jamestown, R.I.

[21] Appl. No.: 381,545

[21] Appl. No.:

[22] Filed: Jan. 31, 1995

[51] Int. Cl.⁶ .................................................. H01M 1/06
[52] U.S. Cl. .............................. 43/107; 43/111; 43/113; 43/139
[58] Field of Search ................... 43/98, 99, 107, 43/113, 111, 139

[56] References Cited

U.S. PATENT DOCUMENTS

| 923,368 | 6/1909 | Myser | 43/139 |
|---|---|---|---|
| 2,879,620 | 3/1959 | McGinnis | 43/139 |
| 4,411,094 | 10/1983 | Spackova et al. | 43/111 X |
| 4,625,453 | 12/1986 | Smith | 43/139 |
| 5,040,326 | 8/1991 | Van Dijnsen et al. | 43/139 X |
| 5,369,909 | 12/1994 | Murphy | 43/112 |
| 5,382,422 | 1/1995 | Dieguez et al. | 43/111 X |
| 5,417,009 | 5/1995 | Butler et al. | 43/113 |

*Primary Examiner*—Joseph J. Hail, III
*Attorney, Agent, or Firm*—Salter & Michaelson

[57] ABSTRACT

A trap system for preventing the entry of mosquitos into a defined area consists of a plurality of mosquito traps positioned at predetermined spacings around the perimeter of the defined area. The plurality of traps cooperate to form a barrier to entering the area.

5 Claims, 2 Drawing Sheets

TRAP SYSTEM FOR REDUCING THE ENTRY OF FLYING INSECTS TO A DEFINED AREA

BACKGROUND AND SUMMARY OF THE INVENTION

The instant invention relates to insect trapping techniques for mosquitos and related hematophagous insects of the order Diptera, and more specifically to a trap system for reducing or preventing the entry of mosquitos or other hematophagous insects into a defined area.

Heretofore, the prior art trapping devices for bloodsucking dipterans have utilized a single trap concept. The single trap concept of the prior art devices caused the trap to be placed in areas which were not the most effective for keeping the insects away from the potential hosts. In this regard, mosquito traps are commonly placed near the animals or humans to be protected, rather than near the source of the insects. By placing the trap too near the animals or humans to be protected, the trap becomes competitive with the potential hosts. The instructions of many trap manufacturers indicate that placement of the trap near the source of the insect infestation will provide better efficacy. However, because of the single trap geometry, the instructions are seldom followed.

Accordingly, among the objects of the invention is the provision of a trap system for reducing the entry of flying insects into the bounded area.

The above object is accomplished by the provision of a trap system utilizing multiple integrated traps spaced around the perimeter of a bounded area in a systematic pattern. More specifically, the trap system of the instant invention utilizes a plurality of carbon dioxide/octenol mosquito traps positioned at predetermined spacings along the perimeter of a bounded area. The concept of the invention is that the multiple spaced traps will cooperate to provide a barrier treatment which is operative for reducing or preventing the entry of mosquitoes into or out of the bounded area.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
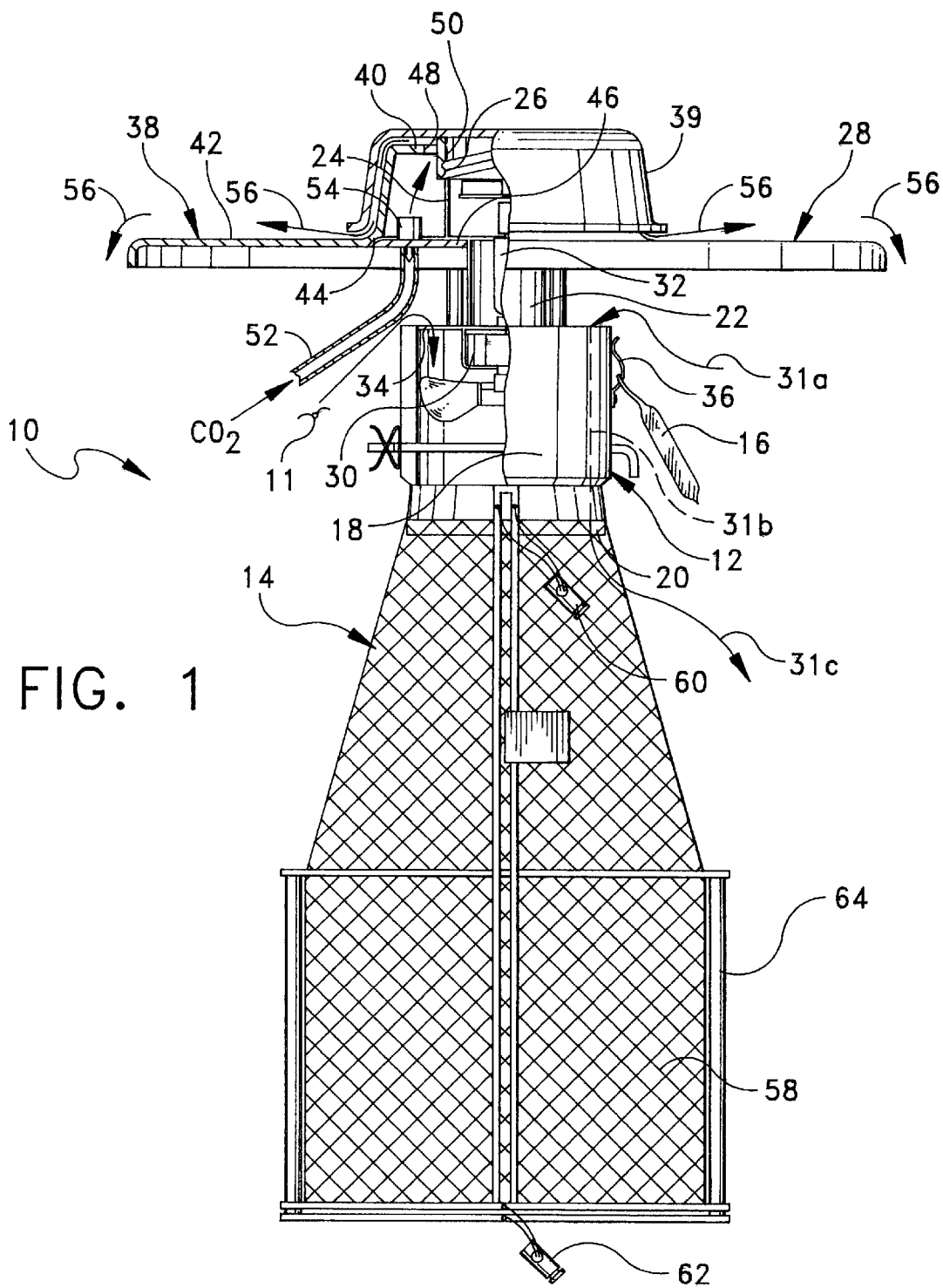
FIG. 1 is an elevational view, partially in section, of a light/fan trap of the type utilized in the trap system of the instant invention.

Referring now to the drawings, a mosquito trap of the type utilized in the instant trap system is illustrated and generally indicated at 10 in FIG. 1. As will hereinafter be more fully described, the instant mosquito trap 10 utilizes both carbon dioxide and octenol as attractants for attracting mosquitos 11 to the trap.

Mosquito trap 10 comprises a fan/light assembly generally indicated at 12 and a trap net generally indicated at 14. A slow release octenol packet 16 is attached to the exterior of the trap 10 to slowly release octenol into the air surrounding the trap 10.

The fan/light assembly 14 comprises a cylindrical body portion 18 having an open bottom 20, and a hollow cylindrical neck portion 22 which extends upwardly terminating in a head portion 24. The head portion 24 includes outward threads 26 at the top thereof for threaded engagement with a cap assembly 28. The fan/light assembly 12 further includes an internal fan 30 which is capable of developing an air flow of about 500 1/min (see arrows 31), and a light source 32 positioned in the neck portion 22 thereof. Air (arrow 31a) enters the trap beneath the cap 28, travels through the body portion (broken line 31b) and exits (arrow 31c) through the open bottom 20 of the trap 10. The head portion 24 encloses an electronics package (not shown) which is operable for controlling the fan 30 and light 32 of the assembly 12. A stainless steel screen 34 is provided at the top of the body portion 20 to prevent the entry of larger insects into the trap body 20. The body portion 18 further includes an external hook 36 for supporting the slow release octenol packet 18.

The cap assembly comprises a ring generally indicated at 38, and a removable top generally indicated at 39. The ring 38 includes a dome-like center portion 40, an extended lip portion 42 for protecting the body portion from rain, and a shoulder 44. The shoulder 44 rests on top of a plastic flange 46 secured to the head portion 24. The dome portion 40 includes an opening 48. The top 39 is generally cup-shaped and includes an inwardly extending, inwardly threaded hub 50 which is received through opening 40 for threaded engagement with the outward threads 26 of the head portion 24 of the light/fan assembly 12. Carbon dioxide from a tank (See FIG. 3) is provided to the interior of the cap assembly 28 by a hose 52 (one-eighth inch inner diameter) attached to an orifice 54 which extends into the interior of the cap assembly 28 through the metal flange 46. The orifice 54 preferably comprises a sapphire-type orifice having a 0.009" opening.

It has been found that mosquitos navigate via a differential sensing of carbon dioxide concentrations that are on the order of parts per million. By detecting concentration differences on their stereo sensilla, the mosquito determines which direction to fly. Since mosquitos utilize a differential concentration of carbon dioxide in their host approach, they navigate towards higher and higher concentrations of carbon dioxide, i.e. towards the source of carbon dioxide which is usually a potential host. However, the neurons which sense carbon dioxide have a threshold limit above which they become disoriented. The instant invention has established that this threshold level is about 1000 ppm. Accordingly, navigation inside a concentrated plume of carbon dioxide (more than 1000 ppm) renders their differential mechanism useless. It is noted that exhaled breath has a concentration of approximately 50,000 ppm carbon dioxide and that dipterans do utilize the boundaries of this concentrate plume to approach a potential host. It is in the vicinity of the trap or host that the concentration becomes critical. Mosquitos generally do not fly into the mouths of a potential host. The instant trap 10 presents the carbon dioxide (arrow 56) around the periphery of the cap assembly 28 to provide a dose rate in the vicinity of the trap 10 of about 1000 ppm. The carbon dioxide released around the cap assembly 28 is drawn downwardly over the edge of the lip 42 to the trap entrance by virtue of a lower pressure created by the fan 30.

The concept of the idea is that the mosquitos will navigate the carbon dioxide stream to the trap entrance (screen 24) without being repelled or caused to turn away from the trap 10 due to too high a concentration. Near the trap entrance they will be drawn into the trap via the suction air flow (arrow 31a) and captured in the trap net 14.

The trap net 14 is constructed from a fine mesh material 58 to allow air flow, yet prevent the escape of even the smallest mosquitos. The trap net 16 is generally cylindrical in shape and it has drawstrings 60 and 62 respectively at the top and bottom thereof. The top draw string 60 allows the trap net 16 to be tightly drawn around the open bottom 20 of the trap body 18. The bottom draw string 62 allows the mosquitos to be emptied from the net 16. The trap net 14 may further include props 64 for suspending the net 58 in an open position.

The slow release octenol packet 16 is operable for releasing octenol to ambient air at a rate of about 0.5 mg/hr. The optimal release rate of 0.5 mg/hr was determined partly by electrophysiology studies conducted on female mosquitos at the Worcester Foundation for Experimental Biology and partly by behavioral testing at the insectary of American Biophysics Corp, In Jamestown, R.I.

Figure 2:
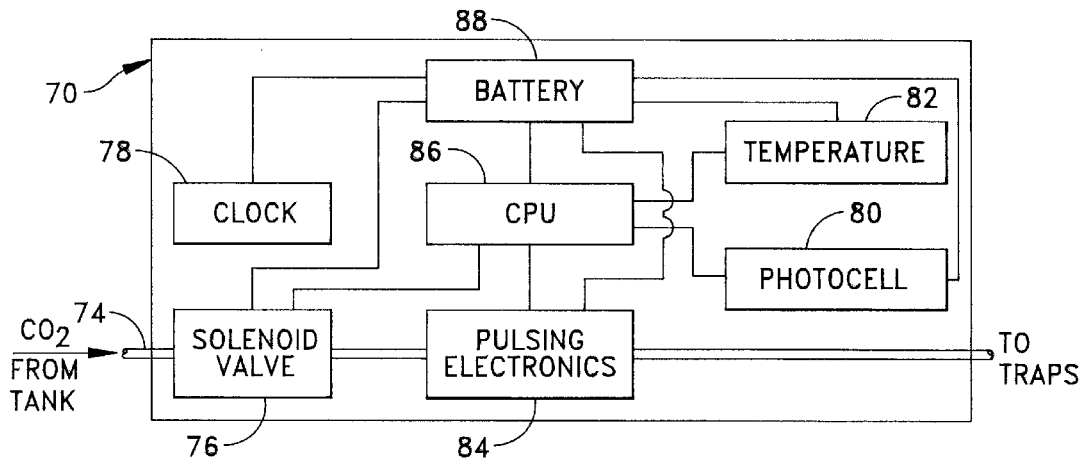
FIG. 2 is a schematic view of the control system of the trap system.
Figure 3:
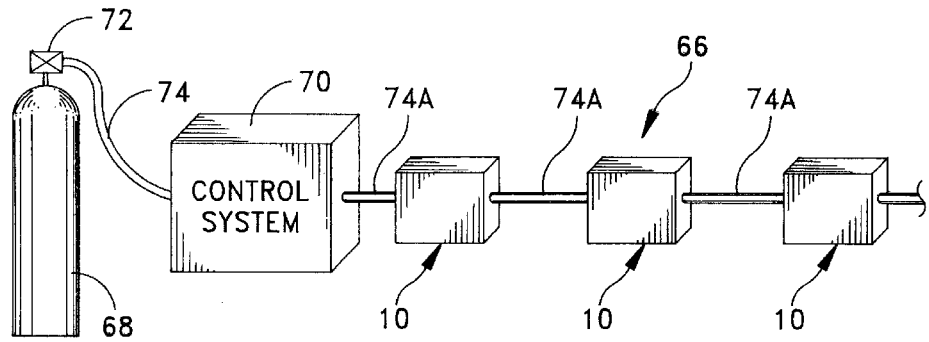
FIG. 3 is a schematic view of the trap system and control system for supplying carbon dioxide to the multiple traps.
Figure 4:
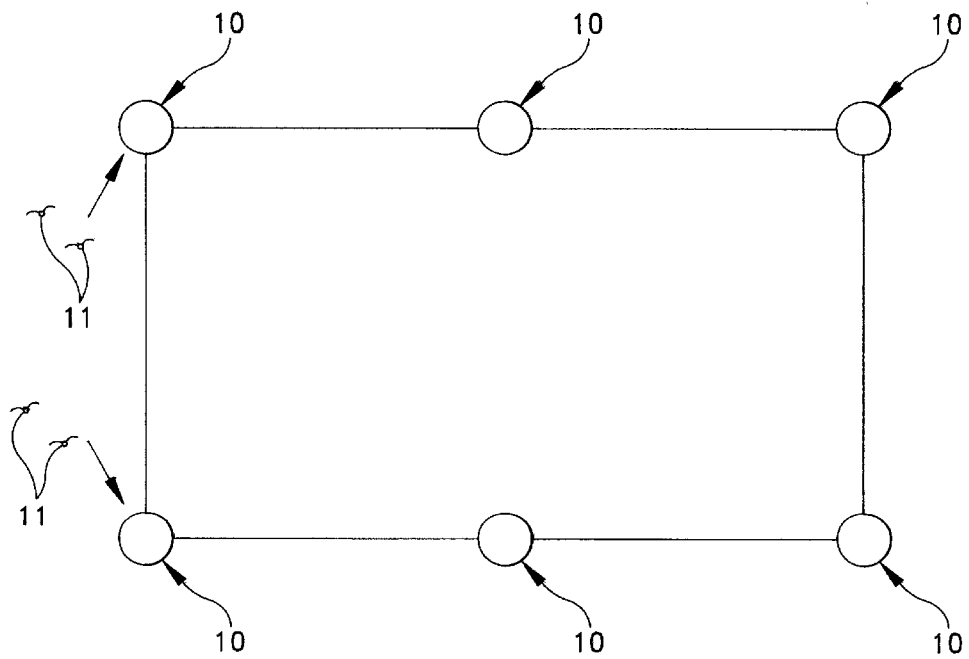
FIG. 4 is a plan view of the trap system with a plurality of traps spaced around the perimeter of a rectangular area system of the instant trap system.

The trap 10 forms a part of an integrated trap system generally indicated at 66 in FIG. 2–4. The trap system 66 comprises a plurality of carbon dioxide/octenol traps 10 which are spaced at predetermined intervals around the perimeter of a defined area, such as a rectangular yard (See FIG. 3), a common source of carbon dioxide, such as a pressurized tank 68 (FIG. 3), and an electronic control system generally indicated at 70. The traps 10 are preferably spaced about 25 to 75 feet apart and preferably include a series of tethers (not shown) in order to provide proper spacing (FIG. 4). The tank 68 preferably includes a single stage regulator 72 set to supply carbon dioxide gas at a pressure of 15 psi. Carbon dioxide is first supplied to the control system 70 by line 74 (one-eighth inch inner diameter tubing), and then to each of the traps 10 in series by lines 74A, wherein each of the consecutive traps 10 has a successively larger orifice for releasing carbon dioxide into the cap assembly, i.e. 0.009", 0.012", 0.015", 0.018", 0.021"and 0.024". The larger orifices downstream compensate for line pressure loss as carbon dioxide travels through the lines 74. It is pointed out that the orifices have been selected to provide a concentration of carbon dioxide of about 1,000 ppm around the cap assembly of each trap. The control system 70 includes an actuable regulator, such as a solenoid valve 76 for selectively supplying carbon dioxide to the traps 10. The control system 70 preferably includes a clock 78 (time of day), a photocell 80, a device for measuring temperature 82; and pulsing electronics 84. A central processing unit 86 is provided for control of the individual components. A battery 88 supplies power to the individual components. The clock 78 and/or photocell 80 allow controlled release of carbon dioxide during times when mosquitos are most active, i.e. at night. Accordingly, the operator can program the system 70 to turn on at dusk and off at dawn using the photocell 80, or can program definite time schedules using the clock 78. By measuring temperature, the system 70 can be programmed not to be activated when the temperature is below 55 degrees (no mosquito activity). The pulsing electronics 84 release the carbon dioxide in a pulsing pattern to simulate breathing of a potential host. In this connection, the carbon dioxide is released into the air in pulses of about 100 milliseconds every two seconds to rhythmically raise and lower the concentration of carbon dioxide in the vicinity of the trap. The solenoid valve 76 opens and closes the flow path of the carbon dioxide for selectively controlling flow.

It is also contemplated that a plurality of individually operable traps 10, i.e. each with its own $CO_2$ source, and control system, could be placed along the border of a defined area to produce the same effect. By placing the traps 10 along the border of a defined area, the traps 10 separate a protected area from an unprotected area, thereby making it possible to intercept many of the mosquitos as they attempt to invade the protected area. The mosquitos are therefore captured and destroyed before they even reach the vicinity of the humans or animals to be protected. The added benefit of the instant trap system 70, is that consistent use of the system will actually lower or possibly eliminate the entire offending insect population. While the instant trapping system is herein described in connection with the trapping of mosquitos, and the use of specific types of mosquito traps, it is to be understood that the general concept of providing multiple traps along the perimeter of a defined area is readily adaptable for use against virtually all types of flying insects. In this connection, however, the traps to be utilized would need to be adapted to attract and destroy the desired offending insect.

It can therefore be seen the instant invention provides an effective trap system for preventing mosquitos from entering a defined area. The multiple trap concept, and predetermined spacing effectively intercepts the mosquitos before they even reach their potential hosts. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A trap system for reducing the entry of flying insects into a predetermined area which is defined by a continuous perimeter extending around said predetermined area, said trap system comprising a plurality of insect traps operable for attracting and capturing a plurality of said insects, said plurality of traps being positioned at predetermined spacings around said continuous perimeter of said predetermined area such that said plurality of spaced traps cooperate to form a barrier for preventing said flying insects from crossing over said perimeter into said predetermined area.

2. The trap system of claim 1 further comprising a control system for selectively controlling each of said plurality of insect traps.

3. In the trap system of claim 2, said control system including devices for controlling the release of insect attractants into the air.

4. A method of reducing the entry of flying insects into a predetermined area comprising the steps of:

defining said predetermined area by determining a continuous perimeter around said predetermined area; and positioning a plurality of insect traps at predetermined spacings around said continuous perimeter of said predetermined area, said insect traps being operable for attracting and capturing said flying insects, said plurality of traps cooperating to substantially prevent said flying insects from crossing over said perimeter into said predetermined area.

5. The method of claim 4 further comprising the step of selectively controlling the operation of said plurality of insect traps.

* * * * *